United States Patent
Hunkel

(10) Patent No.: US 11,753,147 B2
(45) Date of Patent: Sep. 12, 2023

(54) SYSTEM AND METHOD FOR MONITORING THE STATE OF AN UNMANNED AIRCRAFT

(71) Applicant: AIRBUS DEFENCE AND SPACE GMBH, Taufkirchen (DE)

(72) Inventor: Peter Hunkel, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1055 days.

(21) Appl. No.: 16/517,173

(22) Filed: Jul. 19, 2019

(65) Prior Publication Data
US 2020/0039638 A1 Feb. 6, 2020

(30) Foreign Application Priority Data
Jul. 31, 2018 (DE) .......................... 102018118437.9

(51) Int. Cl.
*B64C 19/00* (2006.01)
*B64D 45/00* (2006.01)

(52) U.S. Cl.
CPC .............. *B64C 19/00* (2013.01); *B64D 45/00* (2013.01); *B64U 2201/10* (2023.01); *B64U 2201/20* (2023.01)

(58) Field of Classification Search
CPC .............. B64C 19/00; B64C 2201/141; B64C 2201/146; B64D 45/00; G05D 1/0011; G05D 1/0027; G05D 1/0016; B64U 2201/10; B64U 2201/20
See application file for complete search history.

(56) References Cited

U.S. PATENT DOCUMENTS

| 9,471,452 | B2 | 10/2016 | McElhinney et al. |
| 10,112,727 | B1 | 10/2018 | Cutler |
| 2014/0180914 | A1* | 6/2014 | Abhyanker ............ G05D 1/102 705/332 |

(Continued)

FOREIGN PATENT DOCUMENTS

| JP | 2017097602 A | 6/2017 |
| WO | 2017100245 A1 | 6/2017 |

OTHER PUBLICATIONS

German Office Action for German Patent Application No. 102018118437 dated Jun. 28, 2019; priority document.

(Continued)

*Primary Examiner* — Benjamin P Lee
(74) *Attorney, Agent, or Firm* — Greer, Burns & Crain, Ltd.

(57) ABSTRACT

A system for monitoring the state of an unmanned aircraft includes a first communication unit, a second communication unit that can be integrated within the aircraft, a state transmission unit that can be integrated within the aircraft for transferring state data of the aircraft, a receiving unit integrated within the aircraft for receiving control commands, a computing unit assigned to the aircraft for validating the state of the aircraft, and an external control and monitoring unit connected to the computing unit. The computing unit executes a simulation model of the aircraft, which is based on numerical integration of a system of equations with a simulation state vector. The computing unit sends a warning signal to the control and monitoring unit on the occurrence of one or repeated instances of a model error correction term exceeding specified interval limits.

12 Claims, 2 Drawing Sheets

(56) References Cited

U.S. PATENT DOCUMENTS

| | | |
|---|---|---|
| 2015/0108281 A1 | 4/2015 | Antraygue |
| 2016/0370800 A1 | 12/2016 | Chau et al. |
| 2017/0227972 A1* | 8/2017 | Sabau .................... G05D 1/024 |
| 2017/0308080 A1 | 10/2017 | Brooks et al. |
| 2018/0261100 A1* | 9/2018 | Rachmawati ........... B63B 49/00 |
| 2019/0360783 A1* | 11/2019 | Whittaker ................ H04K 3/41 |
| 2020/0202725 A1* | 6/2020 | Meulle ................ G05D 1/0005 |
| 2021/0096571 A1* | 4/2021 | Modalavalasa ...... G05D 1/0027 |

OTHER PUBLICATIONS

Eggers et al., Multi-UAV Control for Tactical Reconnaissance and Close Air Support Missions: Operator Perspectives and Design Challenges, 20 pages.

European Office Action for corresponding European Patent Application No. 19185646 dated Aug. 25, 2020.

European Search Report for corresponding European Patent Application No. 19185646 dated Oct. 31, 2019.

* cited by examiner

SYSTEM AND METHOD FOR MONITORING THE STATE OF AN UNMANNED AIRCRAFT

CROSS-REFERENCE TO PRIORITY APPLICATION

This application claims the benefit of, and priority to, German patent application number 102018118437.9, filed Jul. 31, 2018. The content of the referenced application is incorporated by reference herein.

TECHNICAL FIELD

Embodiments of the subject matter described herein relate generally to a system and a method for monitoring the state of an unmanned aircraft.

BACKGROUND

Authorities for the certification of aircraft, such as EASA, require in draft regulations for the civil registration of unmanned aircraft that each aircraft be controlled by a responsible pilot. This is the case regardless of whether the pilot is in the cockpit of the aircraft or on the ground in a ground control station. A pilot that is controlling the aircraft via a ground control station can send control commands to the aircraft via an appropriate data link and monitor the aircraft at the same time.

BRIEF SUMMARY

The monitoring and control of a large number of unmanned aircraft is possible with the means of the state of the art while taking into account the aforementioned regulations only by means of a similar number of ground control stations. This can lead to a significant number of pilots, each of which monitors and controls a single aircraft.

It is therefore an object of the disclosure to propose a system that allows the monitoring and control of a large number of unmanned aircraft with prescribed reliability and safety and without requiring an equal number of pilots.

The object is achieved by a system with the features of independent claim 1. Advantageous embodiments and further developments are to be found in the subordinate claims and the following description.

A system for monitoring the state of an unmanned aircraft is proposed, wherein the system comprises a first communication unit, a second communication unit, which can be integrated into the aircraft, a state transmission unit that can be integrated into the aircraft for transmitting the status data of the aircraft, a computer unit assigned to the aircraft to monitor the condition of the aircraft and an external control and monitoring unit connected to the computing unit with input means, wherein the computing unit is set up to execute a simulation model of the aircraft concerned, wherein the simulation model is based on a numerical integration of a system of equations with a simulation state vector, to receive flight status data from the state transmission unit, to repeatedly track the simulation state vector of at least a subset of previously measured flight status data by gradually adjusting at least one functional element of the simulation model by at least one model error correction term and to monitor the variation of the at least one model error correction term and, if there is a single or repeated instance of the model error correction term exceeding predetermined interval limits, to send a warning signal to the control and monitoring unit, wherein the control and monitoring unit is set up to issue a warning message immediately on receiving a warning signal of a user, to continuously display flight status data of the aircraft sent from the state transmission unit, and to change a control mode of the aircraft to direct control by the user by sending a corresponding switching command to the aircraft.

The system according to the disclosure also allows a plurality of unmanned aircraft to be monitored by a single control and monitoring unit that is operated by a single pilot. Nevertheless, for each aircraft there is a possibility of independent, individual and direct control and monitoring by a user. The ratio of aircraft to pilots could be defined, for example, by a worst-case scenario of real system error rates and false alarm rates. It might be appropriate to have a group of up to 5, 10, 20 or 50 aircraft monitored by a system according to the disclosure, wherein there is only a single control and monitoring unit.

With the system according to the disclosure, a control and monitoring unit can be directed to or focused on the aircraft in question immediately on detecting an irregularity that leads to a sudden increase in the effort for tracking the simulation model. The system is essentially based on three core components, which are referred to as the transmission unit, the computing unit and the control and monitoring unit. These are described below in connection with the function thereof.

At this point, it should be noted that the aircraft is equipped with appropriate means to carry out a controlled flight. Among other things, this could include a thrust-generating device, one or more lift-generating devices and devices for influencing the aerodynamics in the form of control flaps and the like. Furthermore, there could also be at least one internal control unit that is able to convert received control commands directly into an influence on said devices. There may also be at least one communication unit with which the aircraft can communicate with external devices. This can be used to receive control commands as well as transmit state data.

The computing unit can be an internal computing unit that is fully integrated into the aircraft. The computing unit could, in a specific case, be able to control the aircraft at least partially by reacting to control commands from the outside and be integrated into a control or regulating process of the aircraft for this purpose. The control commands can be set at different levels. It is conceivable that the computing unit can only provide a flight path or a flight route, so that the aircraft adopts this flight path or flight route independently by appropriate control of a control unit. However, in a particular case the computing unit could also make direct control commands, which lead directly to a change in the current flight status. However, these functions could also be available exclusively in another device, such as said control unit, so that the computing unit is dedicated to the execution of the simulation model and any associated functions.

The state transmission unit shall be understood as a device on board an aircraft that may, in particular, transmit sensor data to the computing unit or to the control and monitoring unit. The transmission may be carried out by the aforementioned communication units. The state transmission unit may be connected in particular to the second communication unit and may transmit the relevant state data to the first communication unit by means of the second communication unit. The first communication unit is coupled to the computing unit and the control and monitoring unit. If the computing unit is an internal computing unit, wired communications are carried out between the state transmission unit and the computing unit. If the aircraft is only fitted with a single computing unit, which is provided with all the functions for the control of the aircraft and for the execution of a simulation, then the transmission of the flight status data to the logical section of the computing unit, which executes the simulation model, can be carried out via a software-based interface.

The flight status data can in particular include accelerations in all three spatial directions, rotation rates around all spatial axes, for example measured in the coordinate system fixed relative to the aircraft, barometric air pressure, dynamic air pressure, flap positions, the condition of a thrust-generating unit and the like. Where possible, the status data that represent the movement of the aircraft and that may provide an indication of the current state of the aircraft should be selected and transmitted.

A special feature of the computing unit lies in the design of a simulation model of the aircraft in question. Basically, such a simulation model can be based on clocked numerical integration of a system of equations, which can be a linear or nonlinear system of equations. With the system of equations, in the specific case a balance of force, in particular of lift, weight forces, mass forces, thrust and resistance is formed and translational and rotational accelerations of the aircraft are formed from this. In an advantageous embodiment, the system of equations is therefore a system of flight mechanics equations. Some of these determined quantities, which also fall under the concept of simulation states, are fed back again to calculate accelerations with them for the next time increment in a next arithmetic step. The simulation model is designed to have all the variables available that the real aircraft has. This applies in particular to control commands for moving flaps and influencing the thrust.

It should be noted at this point that there is no prescribed standard for the content of a status vector of such an aircraft. The design of a simulation model and, consequently, the selection of the required state variables may depend on the type, size and dynamics of the aircraft.

The aim is to synchronize the simulation model in the computing unit with the flight of the aircraft concerned. Consequently, the simulation model should follow the actual movements of the aircraft exactly or largely exactly. However, a simulation model and the real flight of the aircraft drift apart over time without such tracking, since, on the one hand, not all parameters of the simulation model are known so precisely that a drift-free exact simulation is possible. On the other hand, the weather and wind conditions with which the aircraft is confronted are also not known exactly at every simulation time point. As a result, tracking can result in synchronization of the simulation model. For this purpose, at least one functional element of the simulation is adjusted stepwise by a model error correction term.

The at least one function element can be an existing element in a conventional simulation model with at least one algorithm function and is run through in each computing step. A functional element may, for example, have a mathematical formulation of a certain transmission behavior in the frequency domain or in the time domain, which is co-determined by one or more parameters. For example, a model error correction term can be used to change such a parameter in a targeted manner. As a result, the at least one relevant functional element will adjust its transmission behavior stepwise, i.e. in each successive calculation step, so that the drift between the real flight and the simulation model will be eliminated at least in individual time periods.

The at least one functional element may also comprise a filter algorithm, which by applying the model error correction term, for example discretely and recursively, can improve the accuracy of a simulated state variable, even if there are significant errors in measured states.

In general, it should be noted that the state variable affected by the model error correction term may also be a non-measurable state variable, but which in turn affects a different state variable that is compared to a measured state variable. The tracking of the simulation model to the flight of the aircraft may depend in particular on the structure of the simulation model and consequently the type of correction term or the affected state variable can be individually adapted to the aircraft.

In a simple case, monitoring a state variable may include the continuous determination of a difference between a measured state variable and a simulated state variable. A correction term is then determined from the difference, depending on the type and execution of the influence on the functional element. This can be characterized by a scalar variable, a vectoral variable or a matrix. A subsequent comparison with predetermined interval limits allows an assessment of how much effort is involved in tracking the simulation model to the real flight status.

In the case of proper operation of the aircraft, it shall be assumed that the influence of at least one functional element will result in the simulation model always tracking the real flight and that a model error will be gradually eliminated if it is expressed in the behavior of the simulation model. The correction term should continue to be very low or tend towards zero, at least after an initial set of computational steps.

Due to the manifold dependencies of different state variables of the simulation model, which have a kind of cross-connection to each other through the flight mechanics equations, irregularities of one flight mechanical variable for example when operating the aircraft can also be noticed when forming the correction term for a functional element that does not directly calculate the relevant flight mechanical variable. If such a term is close to zero or if it is within a tolerable standard deviation, a deviation can mean that tracking the simulation is suddenly only possible with great mathematical effort.

Consequently, if the correction term departs from the predetermined interval limits once or repeatedly, this is considered by the computing unit as an indication that the aircraft is not behaving as desired. Due to the mentioned multiple dependencies of the state variables, the detection of undesirable behavior of a certain state variable can therefore in many cases also be carried out by monitoring and tracking a completely different state variable. This results in particularly beneficial redundancy in the detection of undesirable behavior. In the case of a discovery of undesirable behavior, a warning signal is sent to the control and monitoring unit.

The control and monitoring unit is provided to display the status data of the aircraft concerned directly to a pilot at the control and monitoring unit on receiving a warning signal and to initiate manual control by the user. This may be accompanied by an audible and/or visual warning, so that the pilot is immediately informed that an aircraft has experienced a deviation from expected behavior. Switching the control mode directly from a (partially) autonomous operation to direct control directly ensures monitoring and control of the aircraft by a pilot. The second communication unit that can be integrated on board the aircraft can also receive a corresponding control command to switch a control mode over and can transmit the control command to a suitable component.

Where a number of aircraft are each equipped with or coupled to such a computing unit and at least one such control and monitoring unit is used for all aircraft, a single pilot may monitor and control a (manageable) number of aircraft. There is no need to forego any particular reliability or safety, nor the benefits of reducing the number of pilots.

In an advantageous embodiment, the at least one functional element has a recursive filter algorithm, which can be influenced by the model error correction term. Consequently, the functional element may comprise the filter element. In particular, the filter algorithm can be a type of predictor-corrector process, which enables an estimate of a resulting state variable based on a performed computational step of the simulation model while taking into account a corresponding measured state variable. By recursively applying the filter algorithm between two consecutive simulation computational steps, the resulting state variable, which is the basis for the subsequent simulation calculation step, can be influenced.

It is also advantageous if the at least one functional element comprises a Kalman filter. The Kalman filter could advantageously be a multidimensional Kalman filter. This may be in particular integrated within a system of flight-mechanics motion equations. In general methods the Kalman filter is expressed by modelling a state matrix of a future point in time, which, in addition to a state matrix of a current point in time also contains deterministic and random external influences. In the case of a time-discrete realization of the Kalman filter, a correction of an estimated state can be carried out with a correction term that determines the so-called innovation of a difference of a measured and a simulated (estimated) state variable, which may require the determination of the innovation covariance and a Kalman filter matrix. In particular, the correction term may be proportional to the innovation. The larger the correction term, the greater the tracking effort required.

The control unit can preferably be an internal control unit. This may facilitate the tracking of the simulation model, since the state data required for the tracking of the simulation model are available directly on board the aircraft. The internal control unit can be implemented to run the simulation as a dedicated computing unit. Alternatively, a conventional internal computing unit of the aircraft may perform several tasks, including running the simulation model, and may also include control and regulating tasks for the aircraft.

The control and monitoring unit may preferably be set up to issue a warning in the event of a loss of a data connection to the aircraft and, in particular, to an internal computing unit.

Furthermore, the computing unit can also be an external computing unit, which is physically separated from the aircraft and is operated separately from the aircraft. An aforementioned communication unit is necessary for this, which can receive the data transmitted by the state transmission unit, so that tracking of the simulation model can be carried out. The communication unit can continue to be bidirectional, so that the computing unit can also send control commands to the aircraft to control the latter.

In an advantageous embodiment, the computing unit is set up to simulate a time delay inherent in the communication unit and devices coupled thereto. The flight status data received in the communication unit will be subject to a certain time delay, which depends on the distance from the aircraft and the processing time in the components being run through. This can be simulated so that the simulation performed in the computing unit lags the real flight status by this time delay. Therefore, tracking is not carried out on already outdated flight status data.

In an advantageous embodiment, the system comprises a plurality of computing units, each assigned to an individual aircraft and together coupled to a single control and monitoring unit. As explained at the outset, this allows a single pilot to use a control and monitoring unit with sufficient reliability and safety to determine whether the aircraft are behaving as intended, so that all the aircraft can be considered to be individually controlled by a pilot from the regulatory point of view. The control and monitoring unit is then particularly preferably embodied to display on a display device only the aircraft that shows unexpected behavior. The other aircraft can continue to be monitored in the background with a synchronized simulation. If one of the aircraft exhibits unexpected behavior, at least the flight condition data of the aircraft concerned could be visually brought to the foreground on the display device.

The control and monitoring unit could also be able to selectively display each of the aircraft concerned at the manual request of a user. It is conceivable that the display device has several screens. One of the screens may be designed to provide an ordered display of all aircraft. The display device may also have at least one dedicated screen that is intended to display an individual aircraft at a time.

In an advantageous embodiment, the flight status data are selected from a group of flight status data, the group having translational and rotary accelerations, system status data, position data and angular position. The translational accelerations can include the accelerations along a longitudinal axis, a vertical axis and a transverse axis, in particular of a coordinate system that is fixed relative to the aircraft or the flight path. These accelerations can be measured by initial measuring units on board the aircraft. The same applies to the rotational accelerations that can be determined around the three axes mentioned above. In particular, these six variables can indicate the movement of the aircraft in space and may be suitable for tracking the simulation model. In an equally advantageous embodiment, the flight status data include system status data. System status data can relate to any data that represent a status of a system. In addition to the operating state of a thrust-generating device and all flap positions, these could also include a landing gear status. The system status data may also have an impact on the flight status of the aircraft. In a further advantageous embodiment, the flight status data include position data. The position data cannot be measured directly, but can be determined by satellite navigation, for example. Since the simulation model could also take into account environment data, the position of the aircraft could also be known from the measured speeds. If there are also deviations from an identified position of the aircraft and a simulated position, this could be due to faulty weather data, a defect of a satellite navigation system or limited functions of a flight controller. Equally advantageously, the flight status data may include position angles.

Due to the multiple dependencies of the state variables in the simulation, not all of the aforementioned state variables that can be tracked by the flight status data need to be monitored, as already mentioned above. For example, if the aircraft is performing horizontal flight, which is characterized by a constant, relatively low angle of attack, undesirable behavior of the aircraft may occur, for example, in the case of the mere tracking of longitudinal acceleration when the longitudinal acceleration and the state of a thrust-generating device do not match. If, for example, a comparatively high thrust force is generated but negative longitudinal acceleration is measured and tracked, this may be due to a faulty state variable or a defect of the thrust generating device, an incorrectly measured value of the angle of attack of the aircraft or other events. The linking of the state variables via the system of equations then results in a large detected model error. By appropriately selecting the mentioned specified interval limits, exceeding a tolerable model error correction term can be detected.

The disclosure also relates to a method for monitoring the state of an aircraft with the features of the secondary claim. A procedure for monitoring the state of an unmanned aircraft is proposed, which includes the steps of executing a simulation model of the aircraft concerned by numerical integration of a system of equations with a simulation state vector in a computing unit, repeatedly tracking the simulation state vector of at least a subset of previously measured flight status data by step-by-step adjustment of at least one functional element of the simulation model by correcting at least one model error, monitoring the variation of the at least one model error correction term and, on detecting a one-time or repeated instance of the model error correction term exceeding predetermined interval limits, sending a warning signal to the control and monitoring unit, and issuing a warning to a control and monitoring unit that is connected to the computing unit on receiving a warning signal, continuously displaying flight status data of the aircraft that are transmitted by a status transmission unit disposed in the relevant aircraft and changing a control mode of the aircraft to direct control by the user by sending a corresponding switching command to a communication unit disposed in the aircraft.

In an advantageous embodiment, the adjustment of at least one functional element can include the execution of a recursive filter algorithm, which is influenced by the at least one model error correction term.

Preferably, at least one functional element comprises a Kalman filter, as already explained earlier.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure result from the following description of the exemplary embodiments and the figures. In this case, all described and/or figuratively represented features by themselves and in any combination form the subject-matter of the disclosure regardless, also, of the composition thereof in the individual claims or their references. In the figures the same reference characters stand for the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
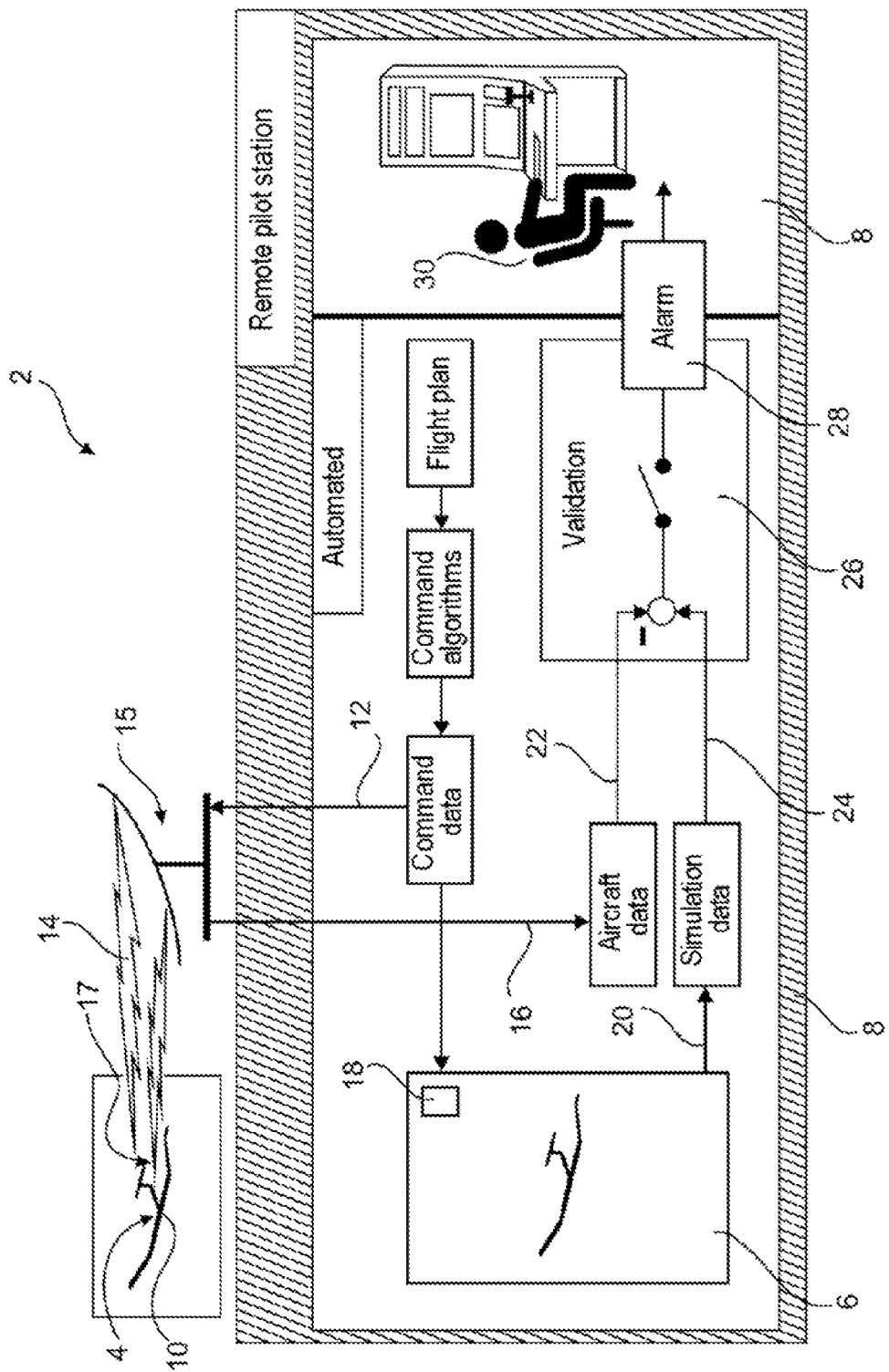
FIG. 1 shows a schematic view of a system according to an embodiment of the invention.

FIG. 1 shows a system 2 for monitoring the state of an unmanned aircraft 4 in a highly schematic representation. The system 2 comprises a computing unit 6 for each unmanned aircraft 4 that is connected to a single control and monitoring unit 8. This could also be referred to as the "Remote Pilot Station". An example is the computing unit 6 implemented as an external computing unit that is separate from the aircraft 4 and located on the ground as an example.

In order to represent the basic features of the system 2, only a single computing unit 6 is shown here. In fact, a number of aircraft 4 may be provided, each of which is associated with a computing unit 6. All computing units 6 are coupled to the control and monitoring unit 8. It may be provided that up to 5, 10, 20, 50 or more aircraft 4 may be assigned in this way to a single control and monitoring unit 8. Moreover, a status transmission unit 10 is provided in each aircraft 4, which is designed to send flight status data of the aircraft 4 that are measured on board the aircraft 4.

The control and monitoring unit 8 is designed to transmit control commands 12 to the aircraft 4 and thereby to control the aircraft 4 at least at times. For this purpose, a data connection 14 is available that extends between a first communication unit 15 on the ground and a second communication unit 17 in the aircraft 4. In this example, the data connection 14 is designed to perform bidirectional transmission of data. The computing unit 6 is then formed by a receiving unit 18 for receiving flight status data 16 that are transmitted by the status transmission unit 10. The transmission of control commands may include the transmission of a flight plan. Command data can be generated from this by appropriate command algorithms.

The computing unit 6 is designed to perform a simulation of the aircraft 4. This allows the computing unit 6 to reproduce the operation of the aircraft 4 as completely as possible in the form of a simulation. Here, clocked numerical integration of a system of flight-mechanics equations is carried out and the accelerations, velocities, position and position angle of the aircraft 4 in space are calculated while taking into account all occurring forces and moments.

When running the simulation, simulation data 20 are generated from which a simulation state vector 24 is produced. From the transmitted flight status data 16, an actual state vector 22 is also generated that includes at least a subset of previously measured state data. The computing unit 6 is designed to repeatedly track the simulation state vector 24 by stepwise adjustment of at least one functional element of the simulation model by means of at least one model error correction term.

Said model error correction term is generated by a validation unit 26, which can be a logical section of the computing unit 6. There, the variation of the at least one model error correction term is monitored, and, if specified interval limits are exceeded once or repeatedly by the model error correction term, a warning signal 28 is sent to the control and monitoring unit 8.

Figure 2:
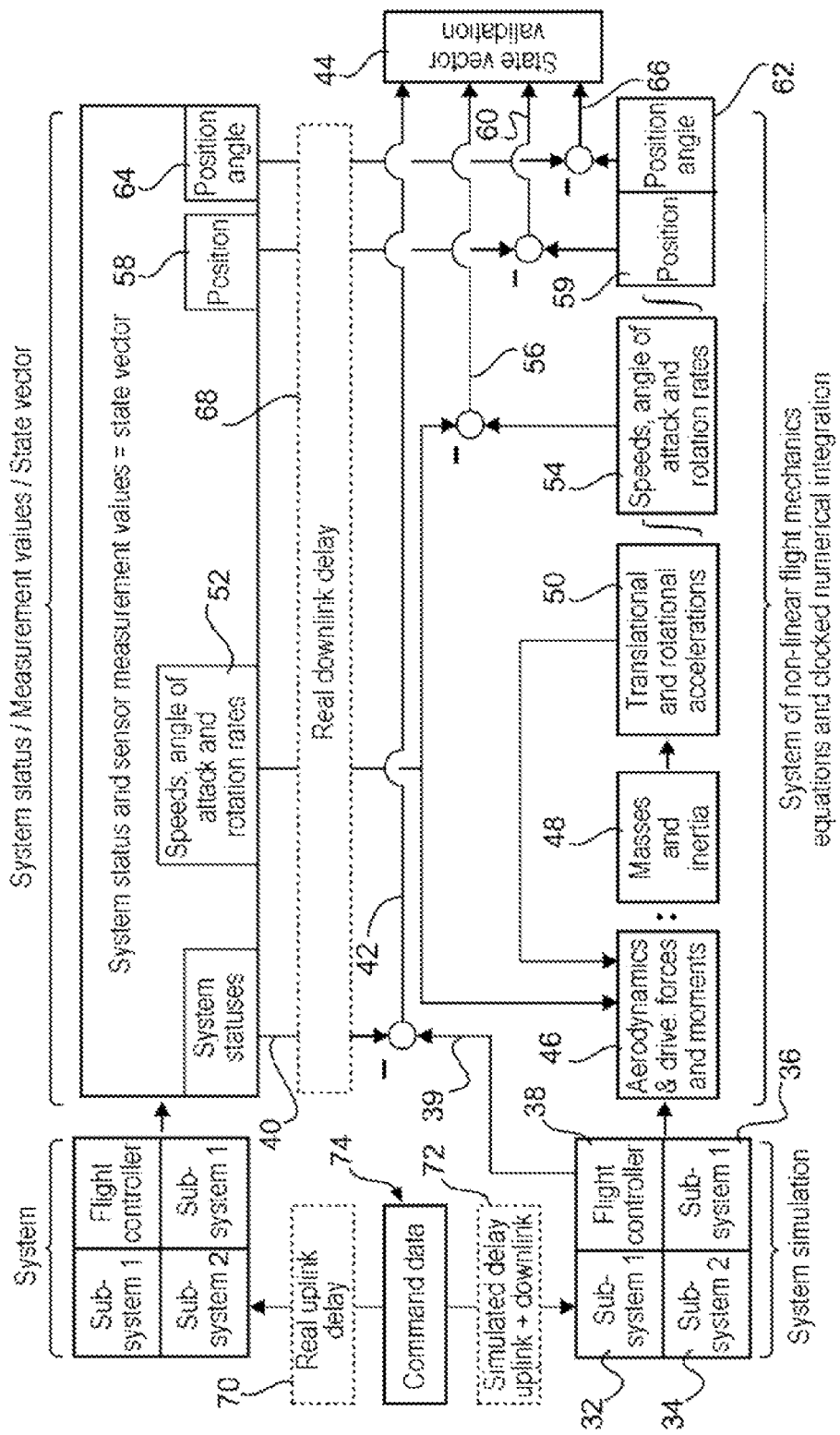
FIG. 2 shows a schematic representation of a validation process.

The control and monitoring unit 8 is caused thereby to transmit control commands of a user 30 directly to the aircraft 4. A control mode of the aircraft 4 is therefore changed from automatic control to direct control. Validation of the state vectors 22 and 24 is represented in somewhat more detail in FIG. 2.

The simulation can be carried out by a simulation unit 31, which can be realized in the form of an executable computer program in the computing unit 6. The simulation unit 31 is designed to simulate several subsystems 32, 34, 36 as well as a flight controller 38. This concerns a number of mechanical, hydraulic and/or electrical systems, such as flaps operated by actuators, a landing gear, an engine and the like, which result in system states 39. These system states 39 can be directly compared with determined system states 40 of the aircraft 4. A first difference 42 is determined thereby that flows into a validation algorithm 44. The first difference 42 may have a series of scalars, a vector or a matrix that contain the deviations of individual simulated system states from measured system states.

Based on the simulation of subsystems 32 to 36 and the flight controller 38, accelerations and moments arising in the aircraft 4 can be determined based on a system of flight mechanics equations. For this purpose, the properties of the aircraft 4 must be defined sufficiently precisely in the simulation model, so that a balance of forces and moments can be generated. This process is shown in a block 46.

Here all masses and inertias 48 must be taken into account and there are translational and rotational accelerations 50, which are coupled back to the simulation with the block 46. Measured speeds, angles of attack and/or rotation rates 52 that are transmitted to the computer unit 6 as measured flight status data by the status transmission unit 10 can also be fed back to the simulation. Not all of these states are required to keep the simulation in the real flight state. Rather, it might be sufficient to use only a subset to achieve synchronization of the simulation and real flight.

Velocities, flow angles and rotation rates 54 are calculated by integration of the translational and rotational accelerations 50. These can be compared with real speeds, flow angles and rotation rates 52. A resulting second difference 56 is also fed to the validation algorithm 44.

Finally, a position 59 of the aircraft in space is determined from further integration, which is compared to an actual position 58 of the aircraft 4. The resulting third difference 60 is fed to the validation algorithm 44. Similarly, the simulated position angles 62 are compared with actual position angles 64 and the fourth difference 66 is fed to the validation algorithm 44.

Blocks 46, 48, 50, 54, 59 and 62 can also be referred to below as functional elements. These can each have a number of parameters and algorithms that determine the behavior of the functional elements 46, 48, 50, 54, 59 and 62. Tracking of the simulation can be achieved by influencing simulation parameters, for example an input variable or an output variable.

The validation algorithm 44 can also obtain knowledge of a model error from the differences 42, 56, 60 and 66. Depending on the type of tracking of the simulation, one or more model error correction terms can be generated, which can be used to influence one of the functional elements 46, 48, 50, 54, 59 and 62. The aim is to achieve successive elimination of the model error.

At least one of the functional elements 46, 48, 50, 54, 59 and 62 may also comprise a Kalman filter. This can be executed recursively regardless of the computational steps of the simulation. The above model error can be used to influence the Kalman filter. In addition, the Kalman filter can also transmit filter variables to the validation algorithm 44, so that these can be incorporated in the validation or monitoring or may determine them decisively.

The validation algorithm is, however, adapted to provide tolerable interval limits for model error correction term limits. If the error correction terms formed in the validation algorithm exceed these interval limits once or multiple times, the effort to track the simulation to the actual flight state is mathematically very complex. This is to be regarded as an indication that the state variables, which are multiply dependent on each other owing to the flight mechanics equations, do not match each other, at least temporarily. If this is the case, the warning signal 28 should be output.

Since there is a delay in the transmission of data between the aircraft and the computing unit 6, time delays of a connection 68 towards the computing unit 6 are simulated as well as of the connection 70 towards the aircraft 4. This results in a delay element 72 that is connected upstream of the simulation unit 31. It should be noted that the simulation unit 31 and the aircraft 4 are supplied with the same input variables 74, which include control commands 12 for example, so that in particular the simulation model and the real aircraft are provided with the same control commands.

In addition, it should be noted that "present" does not exclude any other elements or steps, and "a" or "an" does not exclude a large number. It should also be noted that features described with reference to one of the above exemplary embodiments can also be used in combination with other features of other exemplary embodiments that are described above. Reference numerals in the claims are not to be regarded as a restriction.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for monitoring the state of an unmanned aircraft, comprising: a first communication unit;
   a second communication unit that can be integrated into the aircraft;
   a state transmission unit that can be integrated into the aircraft to transmit state data of the aircraft;
   a computing unit assigned to the aircraft to validate the state of the aircraft; and an external control and monitoring unit connected to the computing unit; wherein the computing unit is configured to:
   carry out a simulation model of the aircraft in question, wherein the simulation model is based on numerical integration of a system of equations with a simulation state vector;
   repeatedly track the simulation state vector of at least one subset of previously measured flight status data by stepwise adjustment of at least one functional element of the simulation model by at least one model error correction term, wherein the model error correction term is determined from a difference between a measured state variable and a simulated state variable; and
   monitor the variation of the at least one model error correction term and send a warning signal to the control and monitoring unit if the model error correction term exceeds predetermined interval limits once or multiple times;
   wherein the control and monitoring unit is configured to issue a warning message directly to a user on receiving a warning signal, to continuously display flight status data of the aircraft received from the status transmission unit and to change a control mode of the aircraft to direct control by the user by sending a corresponding switching command to the aircraft.

2. The system according to claim 1, wherein at least one functional element comprises a recursive filter algorithm that is influenced by the model error correction term.

3. The system according to claim 1, wherein at least one functional element comprises a Kalman filter.

4. The system according to claim 1, wherein the computing unit is an internal computing unit.

5. The system according to claim 1, wherein the computing unit is an external computing unit and wherein the external computing unit is designed to receive state data of the aircraft via a communication unit.

6. The system according to claim 5, wherein the computing unit is configured to simulate an inherent time delay of the communication device and the devices coupled thereto.

7. The system according to claim 1, comprising a plurality of computing units, each assigned to an individual aircraft and coupled to a single control and monitoring unit.

8. The system according to claim 7, wherein:
the control and monitoring unit comprises a display device; and
the control and monitoring unit is configured to bring at least the flight status data of an aircraft to the foreground on the display device when the aircraft in question is exhibiting unexpected behavior.

9. The system according to claim 1, wherein the flight status data is selected from a group of flight status data comprising translational and rotational accelerations, system status data, position data, and position angle.

10. A method for monitoring the state of an unmanned aircraft, comprising the steps of:
executing a simulation model of the aircraft in question by numerical integration of a system of equations with a simulation state vector in a computing unit;
repeatedly tracking the simulation state vectors of at least one subset of previously measured flight status data by stepwise adjustment of at least one functional element of the simulation model by at least one model error correction term, wherein the model error correction term is determined from a difference between a measured state variable and a simulated state variable;
monitoring the variation of the at least one model error correction term and sending a warning signal to the control and monitoring unit on detecting a single or repeated instance of the model error correction term exceeding predetermined interval limits; and
outputting a warning to a control and monitoring unit coupled to the computing unit on receiving a warning signal, continuously displaying flight status data of the aircraft transmitted by a state transmission unit disposed in the aircraft concerned and changing a control mode of the aircraft to direct control by the user by sending a corresponding switching command to a communication unit in the aircraft.

11. The method according to claim 10, wherein the adjustment of the at least one functional element includes the execution of a recursive filter algorithm that is influenced by the at least one model error correction term.

12. The method according to claim 10, wherein at least one functional element comprises a Kalman filter.

* * * * *